United States Patent
Choi et al.

(10) Patent No.: US 9,883,496 B2
(45) Date of Patent: Jan. 30, 2018

(54) METHOD AND APPARATUS FOR TRANSMITTING/RECEIVING CONTROL INFORMATION FOR DEVICE TO DEVICE (D2D) COMMUNICATION IN A WIRELESS COMMUNICATIONS SYSTEM

(71) Applicant: LG Electronics Inc., Seoul (KR)

(72) Inventors: Hyeyoung Choi, Anyang-si (KR); Heejeong Cho, Anyang-si (KR); Jaehoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 273 days.

(21) Appl. No.: 14/382,962

(22) PCT Filed: Feb. 28, 2013

(86) PCT No.: PCT/KR2013/001642
§ 371 (c)(1),
(2) Date: Sep. 4, 2014

(87) PCT Pub. No.: WO2013/133576
PCT Pub. Date: Sep. 12, 2013

(65) Prior Publication Data
US 2015/0049694 A1   Feb. 19, 2015

Related U.S. Application Data

(60) Provisional application No. 61/607,005, filed on Mar. 6, 2012.

(51) Int. Cl.
*H04W 72/04* (2009.01)
*H04L 5/00* (2006.01)
*H04W 76/02* (2009.01)

(52) U.S. Cl.
CPC ......... *H04W 72/042* (2013.01); *H04L 5/0032* (2013.01); *H04W 76/021* (2013.01)

(58) Field of Classification Search
CPC . H04W 72/04; H04W 72/042; H04W 76/021; H04L 5/0032
See application file for complete search history.

(56) References Cited

U.S. PATENT DOCUMENTS

2006/0280142 A1* 12/2006 Damnjanovic ...... H04B 7/2615
370/329
2007/0206531 A1* 9/2007 Pajukoski ......... H04W 74/0866
370/329

(Continued)

FOREIGN PATENT DOCUMENTS

KR   1020110122046 A   11/2011
WO      2010082084 A1    7/2010

(Continued)

OTHER PUBLICATIONS

ETSI TS 136 508 V8.4.0., LTE; E-UTRA and EPC; Common test environments for user equipment conformance testing (3GPP TS 36.508 version 8.4.0 Release 8), Feb. 2010.

*Primary Examiner* — Hassan Kizou
*Assistant Examiner* — Abdullahi Ahmed
(74) *Attorney, Agent, or Firm* — Dentons US LLP

(57) ABSTRACT

According to an embodiment of the present invention, a method for a first terminal to receive control information from a second terminal for device to device communication includes the steps of: receiving downlink control information (DCI) format containing a link indicator; and obtaining selectively one of downlink allocation information and uplink permission information contained in the DCI format according to the link indicator, wherein the downlink allocation information indicates a resource region for receiving data from the second terminal, and the uplink permission information indicates a resource region for transmitting data to the second terminal.

12 Claims, 14 Drawing Sheets

(56) References Cited

U.S. PATENT DOCUMENTS

| | | | |
|---|---|---|---|
| 2010/0027446 A1* | 2/2010 | Choi | H04L 5/0053 370/280 |
| 2010/0202389 A1 | 8/2010 | Cai et al. | |
| 2010/0254268 A1* | 10/2010 | Kim | H04W 36/385 370/241 |
| 2011/0116457 A1 | 5/2011 | Damnjanovic et al. | |
| 2011/0268004 A1* | 11/2011 | Doppler | H04W 72/02 370/311 |
| 2011/0275382 A1 | 11/2011 | Hakola et al. | |
| 2013/0178221 A1* | 7/2013 | Jung | H04L 9/0844 455/450 |
| 2013/0223356 A1* | 8/2013 | Khoshnevis | H04W 72/042 370/329 |
| 2014/0153390 A1* | 6/2014 | Ishii | H04W 76/023 370/230 |
| 2015/0296555 A1* | 10/2015 | Steer | H04L 63/0876 370/329 |

FOREIGN PATENT DOCUMENTS

| | | |
|---|---|---|
| WO | 11015250 A1 | 2/2011 |
| WO | 2011130626 A1 | 10/2011 |
| WO | 2011138495 A1 | 11/2011 |

* cited by examiner

FIG. 11
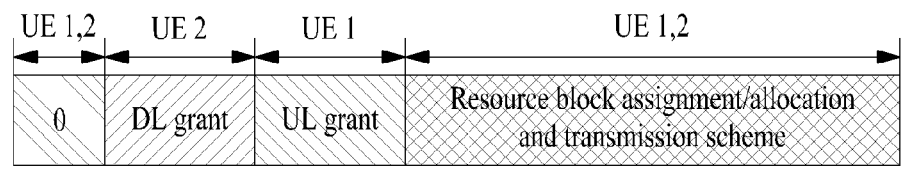
(a) 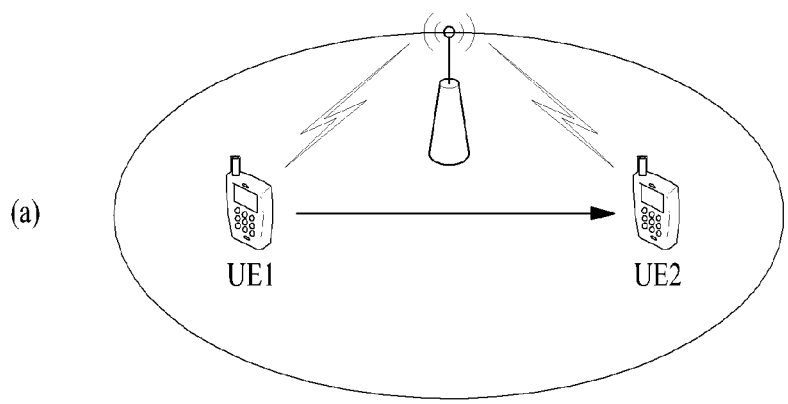
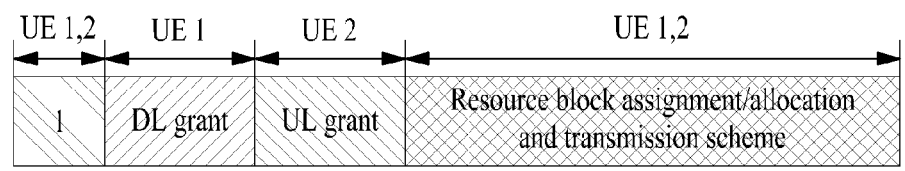
(b) 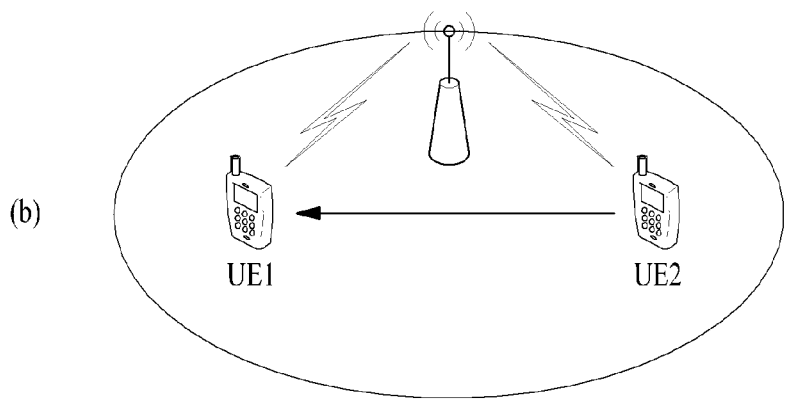

METHOD AND APPARATUS FOR TRANSMITTING/RECEIVING CONTROL INFORMATION FOR DEVICE TO DEVICE (D2D) COMMUNICATION IN A WIRELESS COMMUNICATIONS SYSTEM

TECHNICAL FIELD

The present invention relates to a method and apparatus for acquiring/transmitting control information for device-to-device (D2D) communication in a wireless communication system.

BACKGROUND ART

Wireless communication systems have been widely deployed in order to provide various types of communication services including voice or data. In general, a wireless communication system is a multiple access system that can support communication with multiple users by sharing available system resources (a bandwidth, transmission power, etc.). Examples of multiple access systems include code division multiple access (CDMA), frequency division multiple access (FDMA), time division multiple access (TDMA), orthogonal frequency division multiple access (OFDMA), single carrier frequency division multiple access (SC-FDMA), multi carrier frequency division multiple access (MC-FDMA), etc.

Device-to-device (D2D) communication refers to a communication scheme for configuring a direct link between user equipments (UEs) and voice, data, etc. are transmitted between the UEs without passing through an evolved NodeB (eNB). D2D communication may include schemes such as UE-to-UE communication, peer-to-peer communication, etc. In addition, the D2D communication scheme can be applied to machine-to-machine (M2M) communication, machine type communication (MTC), etc.

D2D communication has been considered as one method for overcoming a burden to an eNB according to data traffic that is remarkably increased. For example, D2D communication can reduce overload of a network because data is transmitted between devices without passing through an eNB unlike in a legacy wireless communication system. In addition, according to introduction of D2D communication, effects of reduction in the number of procedures of an eNB, reduction in power consumption of devices that participate in the D2D communication, increase in data transmission speed, increase in capacity of a network, load balancing, cell coverage enlargement, etc. can be expected.

DISCLOSURE

Technical Problem

An object of the present invention devised to solve the problem lies in a method for receiving resource allocation information for transmitting and receiving data by a user equipment (UE) in device-to-device (D2D) communication, configuration of information for D2D communication, including resource allocation information, and definition of transmission and reception timing according to the resource allocation information.

It is to be understood that both the foregoing general description and the following detailed description of the present invention are exemplary and explanatory and are intended to provide further explanation of the invention as claimed.

Technical Solution

In a first technical aspect of the present invention, provided herein is a method for receiving control information for device-to-device (D2D) communication with a second user equipment (UE) by a first UE in a wireless communication system, the method including receiving a downlink control information (DCI) format including a link indicator, and selectively acquiring any one of downlink allocation information and uplink grant information, included in the DCI format, according to the link indicator, wherein the downlink allocation information indicates a resource region in which data is received from the second UE, and the uplink grant information indicates a resource region for transmitting data to the second UE.

In a second technical aspect of the present invention, provided herein is a first user equipment (UE) apparatus for performing device-to-device (D2D) communication with a second UE in a wireless communication system, the UE apparatus including a reception module, and a processor, wherein the processor receives a downlink control information (DCI) format including a link indicator and selectively acquires any one of downlink allocation information and uplink grant information, included in the DCI format, according to the link indicator, and the downlink allocation information indicates a resource region in which data is received from the second UE, and the uplink grant information indicates a resource region for transmitting data to the second UE The first and second technical aspects may include some of the following features.

The DCI format may be scrambled with a parameter shared by the first UE and the second UE.

The parameter may be a link identifier of the first UE and the second UE.

The DCI format may be scrambled with a UE-specific parameter.

When the first UE acquires the uplink grant information, data may be transmitted to the second UE in a $k^{th}$ subframe from a subframe, in which the DCI format is received, according to the uplink grant information, and when the first UE acquires the downlink grant information, data may be received from the second UE in a $q^{th}$ subframe from a subframe, in which the DCI format is received, according to the downlink grant information.

k and q may depend on an index of a subframe in which the DCI format is received.

The DCI format may be received from a coordination station.

Advantageous Effects

According to the present invention, signaling overhead can be reduced by commonly using control information for device-to-device (D2D) communication.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 11 is a diagram for explanation of a D2D communication procedure according to an embodiment of the present invention.

BEST MODE

Figure 1:
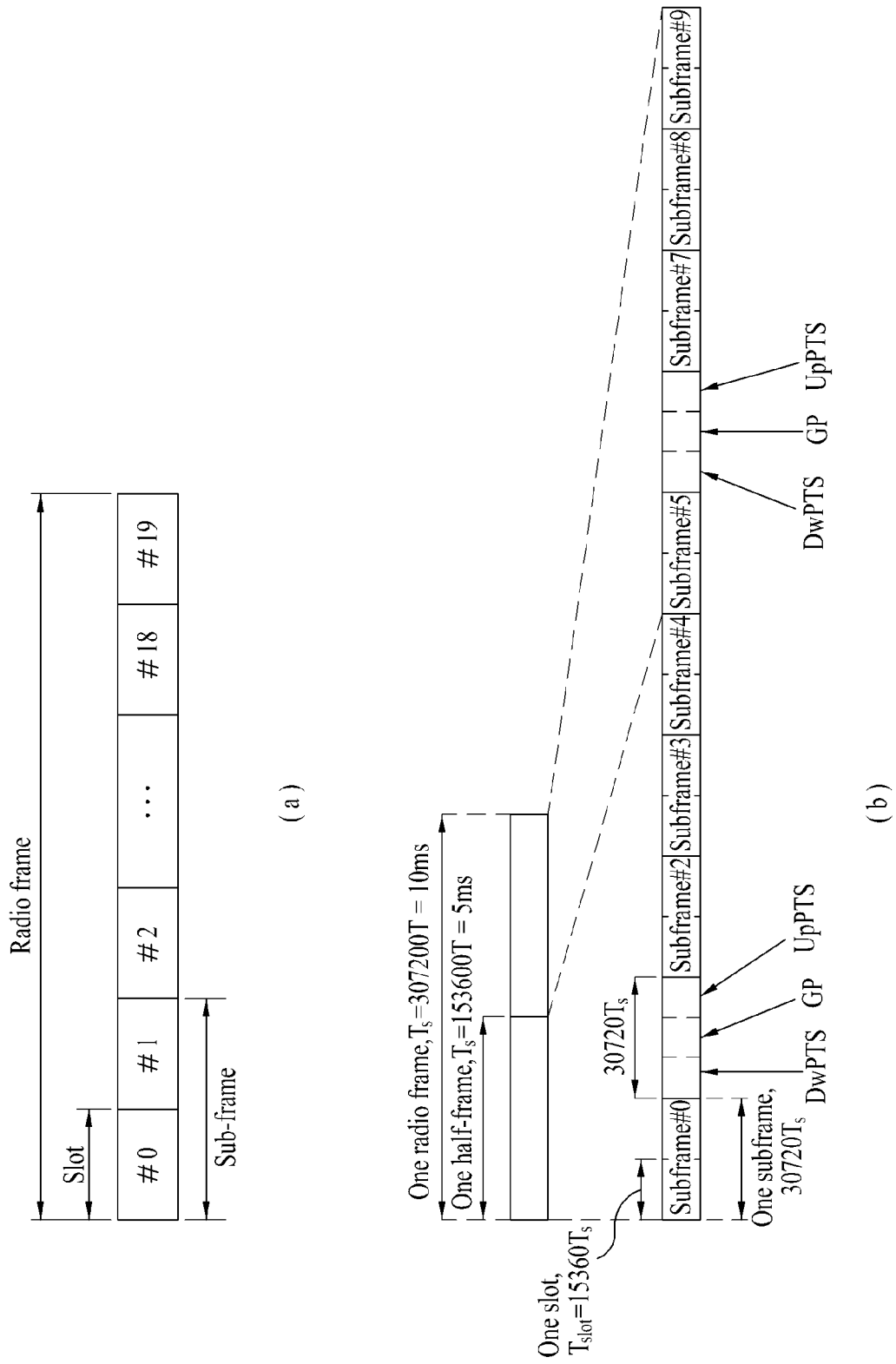
FIG. 1 is a diagram for explanation of a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'access point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, institute of electrical and electronics engineers (IEEE) 802, $3^{rd}$ generation partnership project (3GPP), 3GPP long term evolution (3GPP LTE), LTE-advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as Universal Terrestrial Radio Access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA reference system) and the IEEE 802.16m standard (WirelessMAN-OFDMA Advanced System). For clarity, this application focuses on the 3GPP LTE and LTE-A systems. However, the technical features of the present invention are not limited thereto.

FIG. 1 illustrates a radio frame structure used in a $3^{rd}$ generation partnership project (3GPP) long term evolution (LTE) system. Referring to FIG. 1(a), one radio frame includes 10 subframes, and one subframe includes two slots in a time domain. A time required to transmit one subframe is defined as a transmission time interval (TTI). For example, one subframe may have a length of 1 ms and one slot may have a length of 0.5 ms. One slot may include a plurality of OFDM symbols in a time domain. Since the 3GPP LTE system adopts OFDMA in DL, an OFDM symbol indicates one symbol period. The OFDM symbol may be referred to as an SC-FDMA symbol or a symbol period in UL. A resource block (RB) is a resource allocation unit including a plurality of contiguous subcarriers in a slot. The aforementioned structure of the radio frame is merely an example, and various modifications may be made in the number of subframes included in one radio frame, the number of slots included in one subframe, or the number of OFDM symbols included in one slot.

FIG. 1(b) illustrates a type 2 radio frame structure. The type 2 radio frame includes two half frames, each of which includes five subframes, a DL pilot time slot (DwPTS), a guard period (GP), and a UL pilot time slot (UpPTS). One subframe includes two slots. DwPTS is used for initial cell search, synchronization, or channel estimation by UE.

UpPTS is used for channel estimation in an eNB and UL transmission synchronization of the UE. GP is located between UL and DL to remove interference generated in UL due to multi-path delay of a DL signal.

Here, the structure of the radio frame is merely an example, and various modifications may be made in the number of subframes included in the radio frame, the number of slots included in the subframe, or the number of symbols included in the slot.

Figure 2:
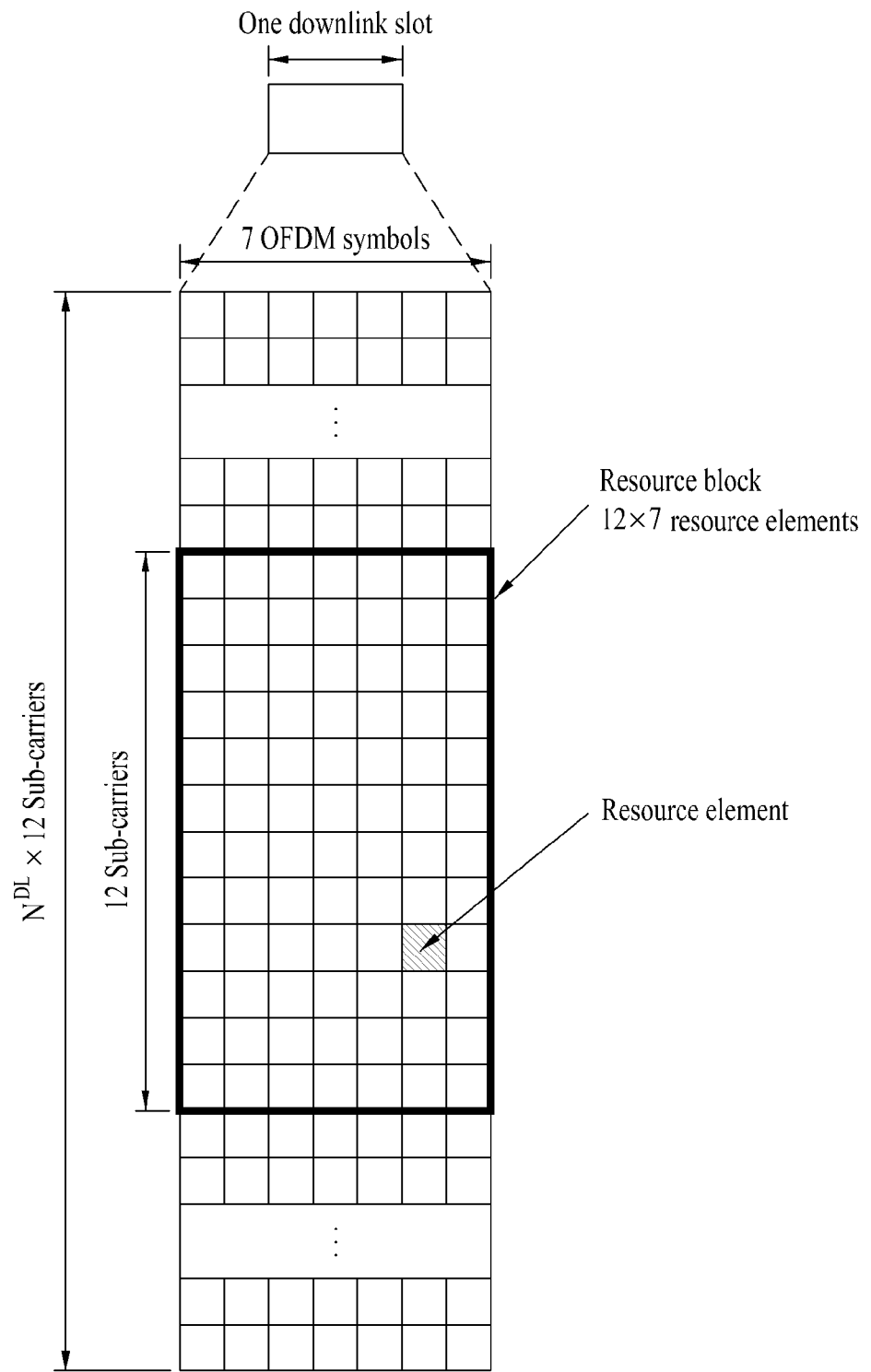
FIG. 2 is a diagram illustrating a resource grid for one downlink (DL) slot.

FIG. 2 is a diagram illustrating a resource grid for one DL slot. In FIG. 2, although one DL slot includes 7 OFDM symbols in a time domain and one RB includes 12 subcarriers in a frequency domain, embodiments of the present invention are not limited thereto. For example, in case of a normal cyclic prefix (CP), one slot includes 7 OFDM symbols. However, in case of extended-CP, one slot may include 6 OFDM symbols. Each element on the resource grid is referred to as a resource element (RE). One RB includes 12×7 REs. A value of $N^{DL}$ that is the number of RBs included in the DL slot may be determined based on a DL transmission bandwidth. A UL slot may have the same structure as the DL slot.

Figure 3:
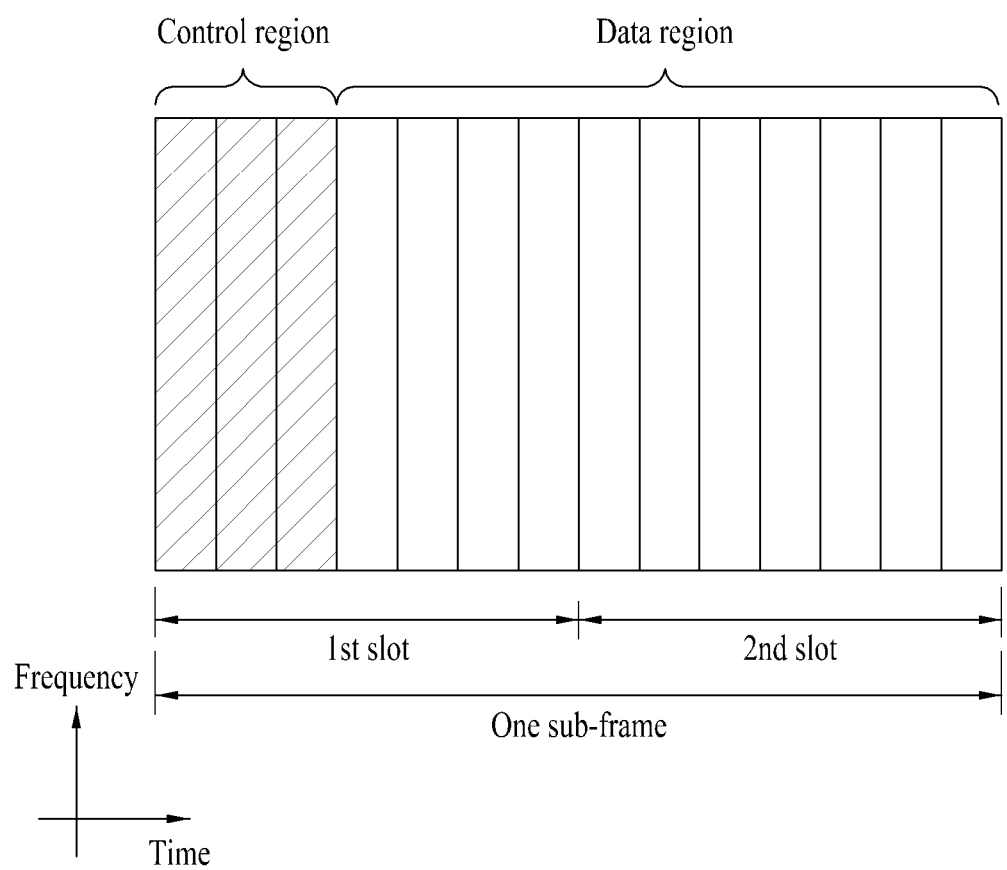
FIG. 3 is a diagram illustrating a structure of a DL subframe.

FIG. 3 is a diagram illustrating a structure of a DL subframe. A maximum of three OFDM symbols of a front portion of a first slot within one subframe corresponds to a control region to which a control channel is allocated. The remaining OFDM symbols correspond to a data region to which a physical DL shared channel (PDSCH) is allocated. Examples of the DL control channels used in the 3GPP LTE system include a physical control format indicator channel (PCFICH), a physical DL control channel (PDCCH), a physical hybrid automatic repeat request indicator channel (PHICH), etc.

The PCFICH is transmitted on a first OFDM symbol of a subframe and includes information regarding the number of OFDM symbols used to transmit the control channel in the subframe.

The PHICH delivers an HARQ acknowledgment/negative acknowledgment (ACK/NACK) signal in response to an uplink transmission. The PDCCH transmits downlink control information (DCI). The DCI transports uplink or downlink scheduling information, or uplink transmission power control commands for UE groups.

DCI Formats

LTE-A (release 10) defines DCI formats 0, 1, 1A, 1B, 1C, 1D, 2, 2A, 2B, 2C, 3, 3A, and 4. DCI formats 0, 1A, 3, and 3A have the same message size to reduce the number of blind decodings as described later. According to the usages of control information transmitted in these DCI formats, the DCI formats are classified into i) DCI formats 0 and 4 used for a UL grant, ii) DCI formats 1, 1A, 1B, 1C, 1D, 2, 2A, 2B, and 2C used for DL scheduling assignments, and iii) DCI formats 3 and 3A used for transmitting TPC commands.

DCI format 0 used for transmission of a UL grant may include a carrier offset required for later-described carrier aggregation (CA) (carrier indicator), an offset that differentiates DCI format 0 from DCI format 1A (flag for format 0/format 1A differentiation), a flag indicating whether frequency hopping applies to PUSCH transmission (frequency hopping flag), information about assignment of RBs to PUSCH transmission of a UE (resource block assignment), a modulation and coding scheme (MCS), a new data indicator used to flush a buffer for an initial transmission in relation to an HARQ process, a TPC command for a scheduled PUSCH, cyclic shift information about a demodulation reference signal (DMRS) (cyclic shift for DMRS and orthogonal code cover (OCC) index), a UL index required for a time division duplexing (TDD) operation, channel quality indicator (CQI) request information (CSI request), etc. Because DCI format 0 uses synchronous HARQ, DCI format 0 does not include a redundancy version (RV), compared to the DCI formats related to DL scheduling assignments. If cross carrier scheduling is not used, the carrier indicator is not included in the DCI format.

DCI format 4 is added to LTE-A release 10, with the aim to support spatial multiplexing for UL transmission. Compared to DCI format 0, DCI format 4 further includes spatial multiplexing information, thus having a relatively large message size. In addition to control information included in DCI format 0, DCI format 4 further includes other control information. Specifically, DCI format 4 further includes an MCS for a second transport block, precoding information for multiple input multiple output (MIMO) transmission, and a Sounding Reference Signal (SRS) request. Because DCI format 4 is larger than DCI format 0 in size, DCI format 4 does not include a flag for format 0/format 1A differentiation.

Among DCI formats 1, 1A, 1B, 1C, 1D, 2, 2A, 2B, and 2C related to DL scheduling assignments, DCI formats 1, 1A, 1B, 1C, and 1D do not support spatial multiplexing, whereas DCI formats 2, 2A, 2B, and 2C support spatial multiplexing.

DCI format 1C supports only contiguous frequency allocation as a compact DL assignment. Compared to other DCI formats, DCI format 1C does not include a carrier indicator and an RV.

DCI format 1A is used for DL scheduling and a random access procedure. DCI format 1A may include a carrier indicator, an indicator indicating whether distributed DL transmission is used, PDSCH resource allocation information, an MCS, an RV, an HARQ process number indicating a processor used for soft combining, a new data indicator used to flush a buffer for an initial transmission in relation to an HARQ process, a TPC command for a PUCCH, a UL index required for a TDD operation, etc.

Control information of DCI format 1 is mostly similar to control information of DCI format 1A except that DCI format 1 is related to contiguous resource allocation and DCI format 1A supports non-contiguous resource allocation. Accordingly, DCI format 1 further includes a resource allocation header, thereby increasing control signaling overhead as a trade-off of an increase in resource allocation flexibility.

DCI formats 1B and 1D are common in that they further include precoding information, compared to DCI format 1. DCI format 1B carries precoding Matrix Index (PMI) confirmation and DCI format 1D carries DL power offset information. Other control information included in DCI formats 1B and 1D is mostly identical to control information of DCI format 1A.

DCI formats 2, 2A, 2B, and 2C basically include most of the control information included in DCI format 1A and further include spatial multiplexing information. The spatial multiplexing information includes an MCS for a second transport block, a new data indicator, and an RV.

DCI format 2 supports closed-loop spatial multiplexing and DCI format 2A supports open-loop spatial multiplexing. Both DCI formats 2 and 2A include precoding information. DCI format 2B supports dual-layer spatial multiplexing combined with beamforming, further including cyclic shift information for DMRS. DCI format 2C is an extension of DCI format 2B, supporting spatial multiplexing of up to 8 layers.

DCI formats 3 and 3A may be used to support TPC information included in the DCI formats used for transmission of a UL grant and DL scheduling assignments, for semi-persistent scheduling. A 1-bit command is used per UE in DCI format 3 and a 2-bit command is used per UE in DCI format 3A.

One of the above-described DCI formats may be transmitted on one PDCCH and a plurality of PDCCHs may be transmitted in the control region of a subframe. A UE may monitor a plurality of PDCCHs.

PDCCH Processing

During transmission of DCI on a PDCCH, cyclic redundancy check (CRC) is added and a radio network temporary identifier (RNTI) is masked to DCI during this process. Here, different RNTIs may be used according to the transmission purpose of the DCI. In detail, in the case of a paging message associated with network initiated connection configuration, when a P-RNTI is associated with random access and an RA-RNTI is associated with a system information block (SIB), an SI-RNTI may be used. In addition, in the case of unicast transmission, a C-RNTI as a unique UE identifier may be used. DCI added with CRC is encoded in a predetermined code and then adjusted according to the amount of resourced used for transmission via rate-matching.

For the aforementioned transmission of the PDCCH, control channel elements (CCEs) as contiguous logical allocation units are used when the PDCCH is mapped to REs for effective processing. The CCE includes 36 REs that correspond to 9 resource element group (REG) units. The number of CCEs required for a specific PDCCH depends on DCI payload that is a control information size, a cell bandwidth, a channel coding rate, etc. In detail, the number of CCEs for a specific PDCCH may be defined according to a PDCCH format, as illustrated in [Table 1].

TABLE 1

| PDCCH format | Number of CCEs | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

As shown in Table 1 above, the number of CCEs depends on a PDCCH format. For example, when a channel state becomes poor while a transmitter uses PDCCH format 0, the transmitter may adaptively use a PDCCH format, and for example, change the PDCCH format to 2.

Blind Decoding

As described before, one of the above four formats is used for a PDCCH, which is not known to a UE. Therefore, the UE should decode the PDCCH without knowledge of the PDCCH format. This is called blind decoding. However, because decoding of all possible DL CCEs for each PDCCH format may impose a great constraint on the UE, a search space is defined in consideration of scheduler restrictions and the number of decoding attempts.

That is, a search space is a set of candidate PDCCHs formed by CCEs at a given aggregation level, which the UE is supposed to attempt to decode. Aggregation levels and the number of PDCCH candidates for each aggregation level may be defined as shown in [Table 2] below.

TABLE 2

| | Search space | | Number of PDCCH |
| --- | --- | --- | --- |
| | Aggregation level | Size (in CCEs) | candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As noted from [Table 2] above, there are four aggregation levels and thus the UE has a plurality of search spaces at each aggregation level.

In addition, search spaces may be classified into a UE-specific search space (USS) and a common search space (CSS). The USS is configured for specific UEs. Each of the UEs may monitor the USS (may attempt to decode a set of PDCCH candidates according to possible DCI formats) and verify an RNTI masked with a PDCCH and a CRC of the PDCCH. If the RNTI and CRC are valid, the UE may acquire control information from the PDCCH.

The CSS is designed for the case where a plurality of UEs or all UEs need to receive a PDCCH, for example, for dynamic scheduling of system information or a paging message. Nonetheless, the CSS may be used for a specific UE depending on resource management. The CSS may overlap with the USS.

Figure 4:
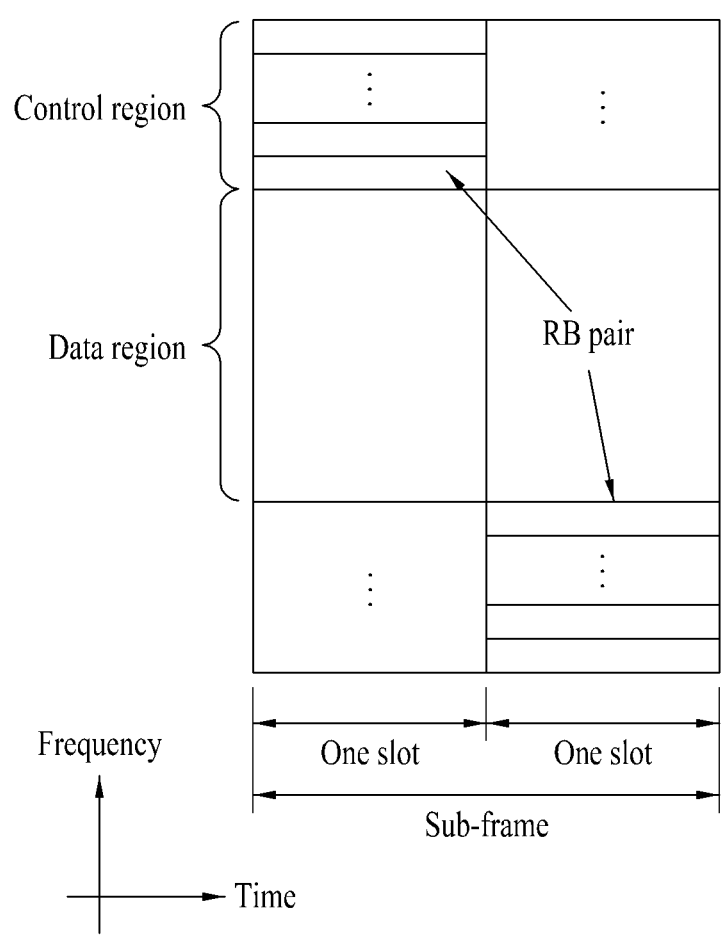
FIG. 4 is a diagram illustrating a structure of an uplink subframe.

FIG. 4 is a diagram illustrating a structure of an uplink subframe. The uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Physical Hybrid-ARQ Indicator Channel (PHICH)

Figure 5:
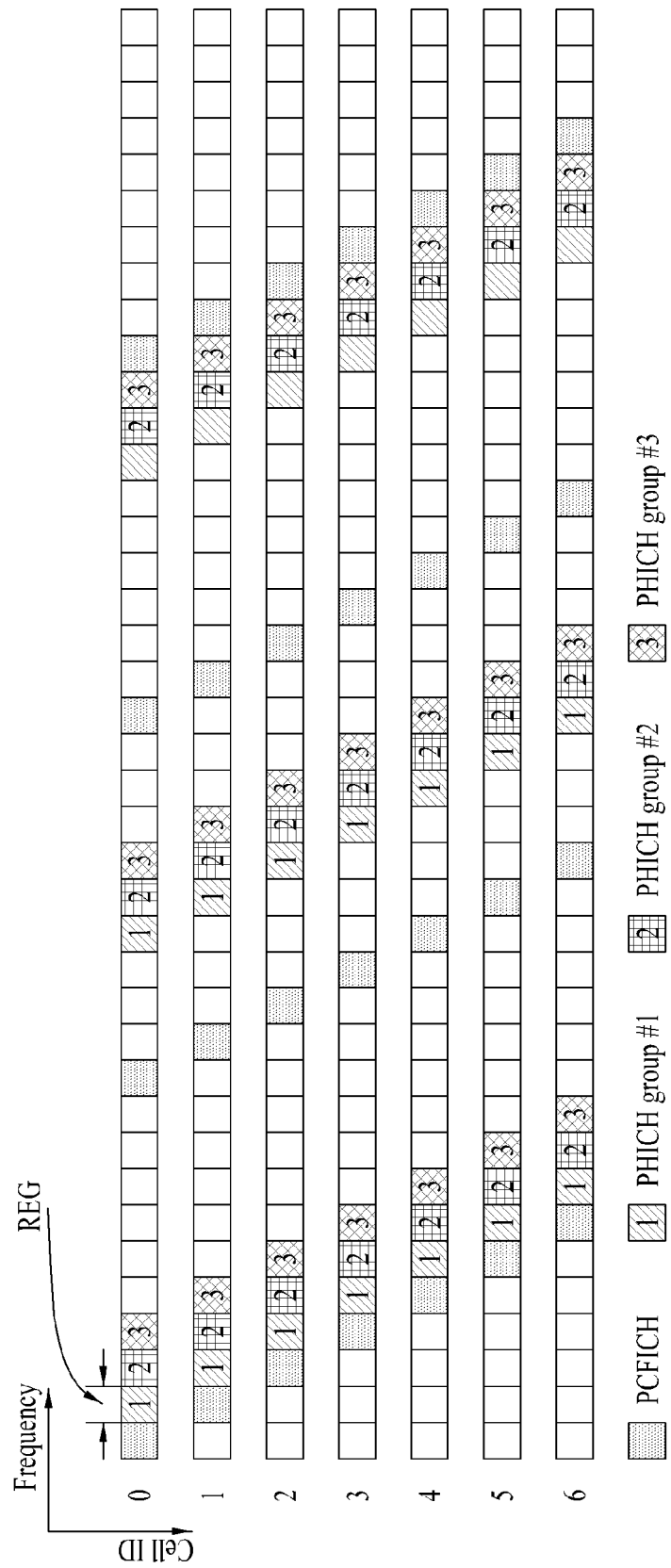
FIG. 5 illustrates general positions of a PCFICH and PHICHs in a specific bandwidth.

FIG. 5 illustrates general positions of a PCFICH and PHICHs in a specific bandwidth. A PHICH delivers an ACK/NACK for a UL data transmission. A plurality of PHICH groups is formed in one subframe and one PHICH group includes a plurality of PHICHs. Accordingly, one PHICH group includes PHICHs for a plurality of UEs.

As illustrated in FIG. 5, a PHICH for each UE in the plurality of PHICH groups is allocated by a lowest physical resource block (PRB) index of a PUSCH resource allocation and a DMRS cyclic shift indicated by a UL grant on a PDCCH. A DMRS is a UL reference signal transmitted along with a UL signal, for channel estimation by which to demodulate UL data. PHICH resources are indicated by an index pair such as ($n_{PHICH}^{group}$, $n_{PHICH}^{seq}$). In the index pair ($n_{PHICH}^{group}$, $n_{PHICH}^{seq}$), $n_{PHICH}^{group}$ is a PHICH group number and $n_{PHICH}^{seq}$ is an orthogonal sequence index in a PHICH group with the PHICH group number. $n_{PHICH}^{group}$ and $n_{PHICH}^{seq}$ are determined by [Expression 1] below.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$

[Expression 1]

In Expression 1 above, $n_{DMRS}$ is a cyclic shift value for DMRSs used in a UL transmission associated with the PHICH, mapped to a value of the 'cyclic shift for DMRS' field of the latest UL grant control information (e.g., DCI format 0/4) for a transport block related to a corresponding PUSCH transmission. For example, the 'cyclic shift for DMRS' field of the latest DCI format for a UL grant may be 3 bits in size. If this field has value '000', $n_{DMRS}$ may be set to '0'.

In [Expression 1], $N_{SF}^{PHICH}$ is a spreading factor (SF) size used for PHICH modulation, and $I_{PRB\_RA}^{lowest\_index}$ is a lowest PRB index of the first slot of the PUSCH transmission. $I_{PHICH}$ is 1 only in a special case in a TDD system (when UL/DL configuration 0 is set and a PUSCH is transmitted in a subframe corresponding to n=4 or 9) and otherwise, $I_{PHICH\ is}$ 0. $N_{PHICH}^{group}$ is the number of PHICH groups configured by a high layer, calculated by [Expression 2] below.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Expression 2]}$$

In [Expression 2], $N_g$ is information about the amount of PHICH resources, expressed in 2 bits transmitted on a physical broadcast channel (PBCH) ($N_g \in \{1/6, 1/2, 1, 2\}$) and $N_{RB}^{DL}$ is the number of DL RBs.

[Table 3] below shows exemplary orthogonal sequences defined in the legacy 3GPP LTE release-8/release-9.

TABLE 3

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 6:
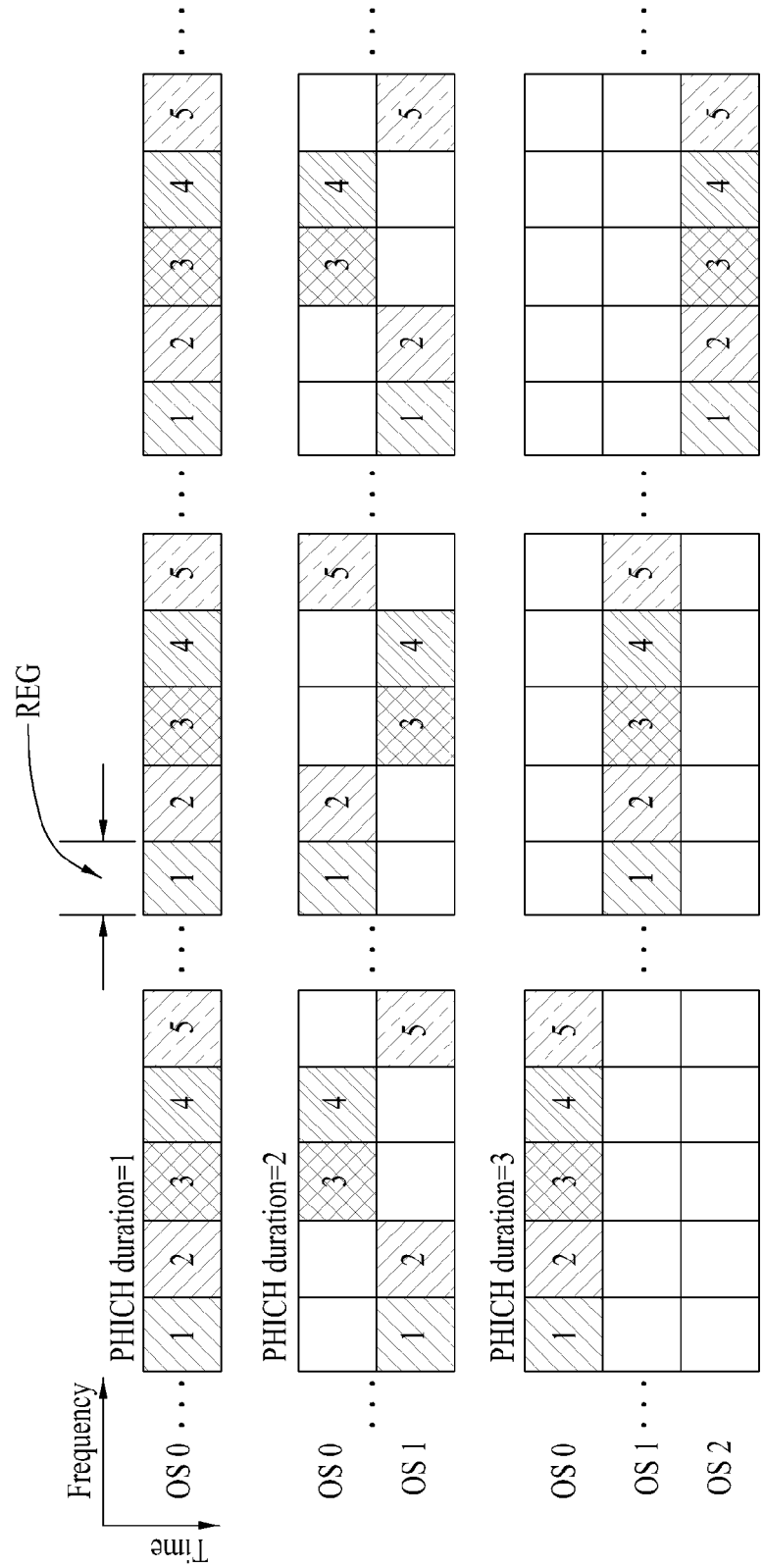
FIG. 6 illustrates the positions of DL REs to which PHICH groups are mapped.

FIG. 6 illustrates the positions of DL REs to which PHICH groups are mapped. A PHICH group may be configured in a different time area (i.e. a different OFDM Symbol (OS)) in a subframe according to a PHICH duration, as illustrated in FIG. 6.

Carrier Aggregation (CA)

Figure 7:
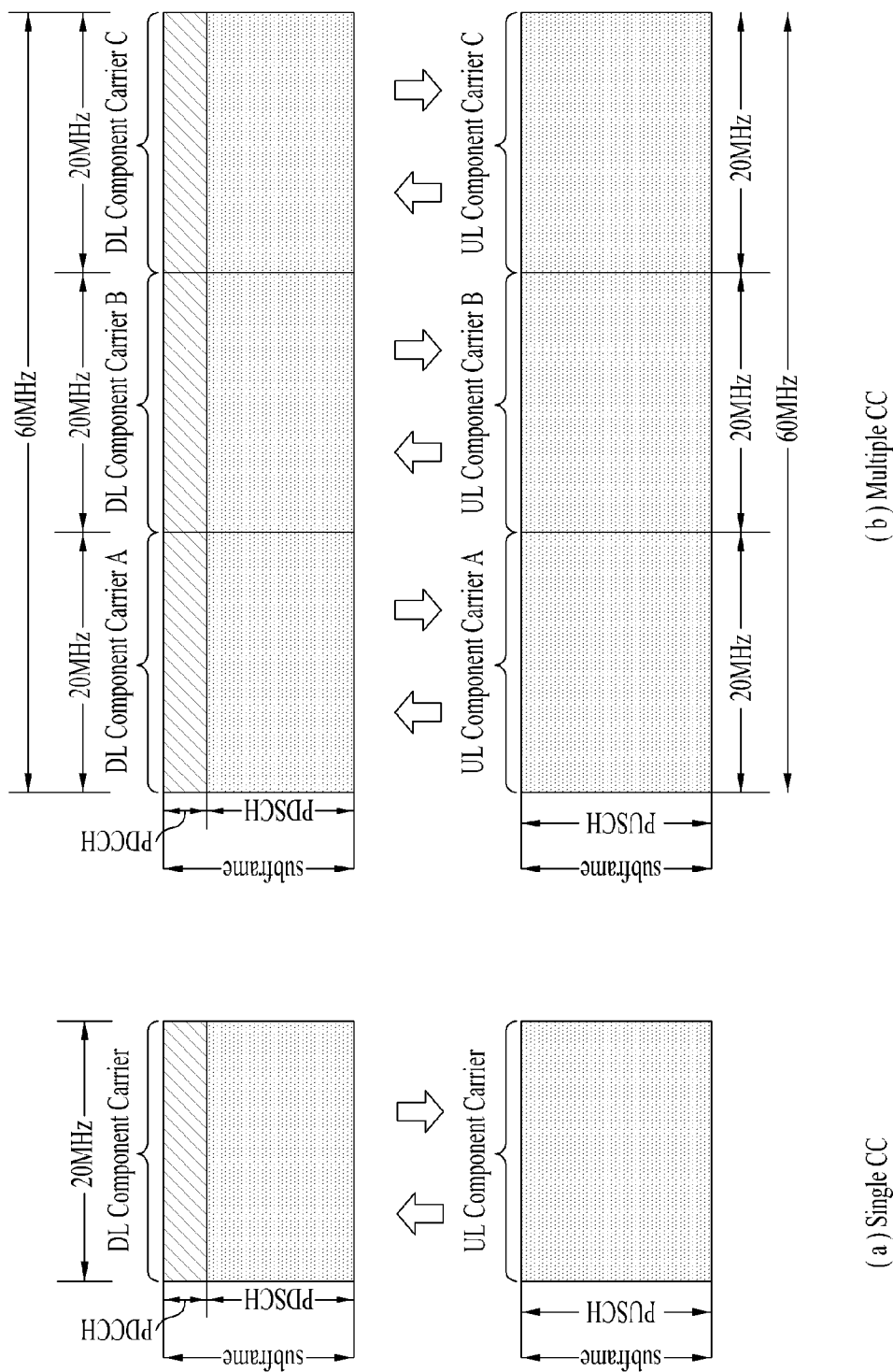
FIG. 7 is a diagram for explanation of carrier aggregation (CA).

FIG. 7 is a diagram for explanation of CA. Prior to a description of CA, concept of a cell introduced to manage wireless resources in LTE-A will be described. The cell may be interpreted as a combination of DL resources and UL resources. Here, the UL resources are not necessary element. Thus, the cell may include DL resources only or DL resources and UL resources. However, this is definition in current LTE-A release 10. In an opposite case, that is, the cell may include UL resources only. A downlink resource may be defined as a downlink component carrier (DL CC) and an uplink resource may be defined as an uplink component carrier (UL CC). The DL CC and the UL CC may be represented using a carrier frequency. The carrier frequency refers to a center frequency at a corresponding cell.

A cell may be classified as a primary cell (Pcell) operating at a primary frequency and a secondary cell (SCell) operating at a secondary frequency. The PCell and the SCell may be collectively referred to as a serving cell. The PCell is used for a UE to establish an initial connection or may be a cell indicated during connection re-establishment or handover. That is, the PCell may be regarded as a central cell associated with control in a CA environment that will be described below. The UE may be allocated PUCCH in a PCell of the UE and may transmit the PUCCH. The SCell may be configured after RRC connection establishment and used to provide additional radio resources. In the CA environment, the remaining serving cells except for the PCell may be regarded as the SCell. Accordingly, if CA has not been configured for a UE in RRC_CONNECTED state or the UE in RRC_CONNECTED state does not support CA, one serving cell including only a PCell exists for the UE. On the other hand, if CA has been configured for a UE in RRC_CONNECTED state, one or more serving cells including a PCell and total SCells exist for the UE. A network may add one or more SCells to a PCell that is initially configured during connection establishment, for a UE supporting CA, after initial security activation is initiated.

Hereinafter, CA will be described with reference to FIG. 7. CA is technology introduced to use a broader band in order to satisfy requirements for a high transmission rate. CA may be defined as aggregation of two or more component carriers (CCs) with different carrier frequencies. Referring to FIG. 7, FIG. 7(a) illustrates a subframe when a conventional LTE system uses one CC and FIG. 7(b) illustrates a subframe when CA is used. FIG. 7(b) illustrates an example in which three CCs at 20 MHz are used to support a total 60 MHz bandwidth. Here, CCs may be contiguous or noncontiguous.

UE may simultaneously receive and monitor DL data through a plurality of DL CCs. A linkage between a DL CC and a UL CC may be indicated by system information. The DL CC/UL CC link may be fixed or semi-statically configured in a system. In addition, although an overall system band includes N CCs, a frequency band for monitoring/receiving of specific UE may be limited to M(<N) CCs. Various parameters associated with CA may be set cell-specifically, UE group-specifically, or UE-specifically.

Figure 8:
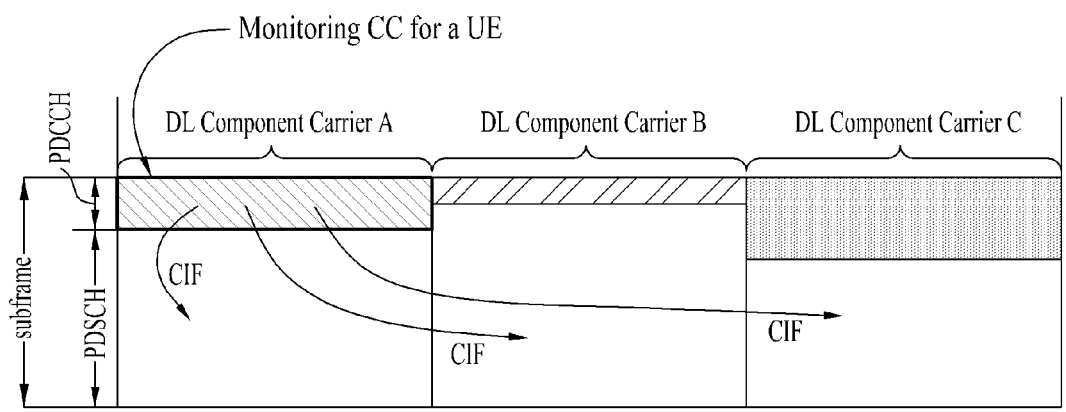
FIG. 8 is a diagram for explanation of cross carrier scheduling.

FIG. 8 is a diagram for explanation of cross carrier scheduling. Cross carrier scheduling is interpreted as, for example, including DL scheduling allocation information of different DL CCs in a control region of one DL CC of a plurality of serving cell or including UL scheduling grant information of a plurality of UL CCs linked with one DL CC in a control region of the DL CC.

First, a carrier indicator field (CIF) will be described.

As described above, the CIF may be included or may not be included in a DCI format transmitted through a PDCCH. In this regard, when the CIF is included in the DCI format, this means that cross carrier scheduling is applied. When the cross carrier scheduling is not applied, DL scheduling allocation information is valid on a DL CC in which DL scheduling allocation information is currently transmitted. In addition, UL scheduling grant is valid on one UL CC linked with a DL CC in which DL scheduling allocation information is transmitted.

When the cross carrier scheduling is applied, a CIF indicates a CC associated with DL scheduling allocation information transmitted through a PDCCH in one DL CC. For example, referring to FIG. 8, DL allocation information regarding a DL CC B and a DL CC C, that is, information regarding PDSCH resources is transmitted through a PDCCH in a control region in a DL CC A. UE may monitor the DL CC A to know a PDSCH resource region and corresponding CC through the CIF.

Whether the CIF is included or not included in the PDCCH may be semi-statically set and the CIF may be enabled UE-specifically via higher layer signaling. When the CIF is disabled, a PDCCH in a specific DL CC may allocate PDSCH resources of the same DL CC and allocate PUSCH resources in a UL CC linked with a specific DL CC. In this case, the same coding method, CCE-based resource mapping, and DCI format as those of a conventional PDCCH structure may be applied.

Meanwhile, when the CIF is enabled, a PDCCH in a specific DL CC may allocate PDSCH/PUSCH resources in one DL/UL CC indicated by the CIF among a plurality of aggregated CCs. In this case, the CIF may be additionally defined in a conventional PDCCH DCI format or may be defined as a fixed field with a length of 3 bits. In addition, a CIF position may be fixed regardless of a DCI format size. In this case, the same coding method, CCE-based resource mapping, and DCI format as those of a conventional PDCCH structure may also be applied.

In the presence of a CIF, a BS may allocate a PDCCH monitoring DL CC set to a UE, thereby reducing blind decoding complexity of the UE. The PDCCH monitoring DL CC set is a part of total aggregated DL CCs. The UE detects/decodes a PDCCH only in the DL CCs of the PDCCH monitoring DL CC set. That is, for PDSCH/PUSCH scheduling for UE, the BS may transmit the PDCCH only on the PDCCH monitoring DL CC set. The PDCCH monitoring DL CC set may be configured UE-specifically, UE group-specifically, or cell-specifically. For example, as illustrated in FIG. 8, when three DL CCs are aggregated, a DL CC A may be set as a PDCCH monitoring DL CC. When a CIF is disabled, a PDCCH on each DL CC may schedule only a PDSCH on DL CC A. Meanwhile, when a CIF is enabled, a PDCCH on a DL CC A may also schedule a PDSCH on another DL CC. When the DL CC A is set as the PDCCH monitoring CC, a PDSCCH is not transmitted to DL CC B and DL CC C.

In a system using the aforementioned CA, UE may receive a plurality of PDSCHs through a plurality of DL carriers. In some cases, the UE may need to transmit ACK/NACKs responding to respective data in one UL CC in one subframe. When a plurality of ACK/NACKs using PUCCH formats 1a/1b are transmitted in one subframe, high transmission power is required and a PAPR of UL transmission is increased. In addition, a transmission available distance of UE from a BS may be reduced due to ineffective use of a transmission power amplifier. In order to transmit a plurality of ACK/NACKs through one PUCCH, ACK/NACK bundling or ACK/NACK multiplexing may be used.

In some cases, ACK/NACK information responding to many DL data due to the use of CA and/or many DL data transmitted in a plurality of DL subframes in a TDD system need to be transmitted through a PUCCH in one subframe. In this case, when a bit number of the ACK/NACK to be transmitted is greater than a bit number that can be supported by ACK/NACK bundling or multiplexing, the ACK/NACK information cannot be properly transmitted using the aforementioned methods.

ACK/NACK Multiplexing Scheme

In case of ACK/NACK multiplexing, contents of ACK/NACK to a plurality of data units may be identified via a combination of an ACK/NACK unit used in actual ACK/NACK transmission and one of QPSK-modulated symbols. For example, it is assumed that one ACK/NACK unit delivers 2 bit information and receives a maximum of 2 data units. Here, it is assumed that an HARQ ACK to each respective data unit may be represented by one ACK/NACK bit. In this case, a transmitter transmitting data may identify the ACK/NACK results as shown in [Table 4] below.

TABLE 4

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In [Table 4] above, HARQ-ACK (i) (i=0 and 1) represents ACK/NACK results to a data unit i. As described above, since it is assumed that a maximum of 2 data units (data unit 0 and data unit 1) are received, an ACK/NACK result to the data unit 0 is represented by HARQ-ACK(0) and an ACK/NACK result to the data unit 1 is represented by HARQ-ACK(1), in [Table 4] above. In [Table 4] above, discontinuous transmission (DTX) indicates that a data unit corresponding to HARQ-ACK(i) is not transmitted or a receiver does not detect presence of a data unit corresponding to HARQ-ACK(i). In addition, $n_{PUCCH,x}^{(1)}$ indicates an ACK/NACK unit that is used for actual ACK/NACK transmission. When a maximum of 2 ACK/NACK units are present, $n_{PUCCH,x}^{(1)}$ may be indicated as $n_{PUCCH,0}^{(1)}$ and $n_{PUCCH,1}^{(1)}$. In addition, b(0) and b(1) indicate two bits transmitted by the selected ACK/NACK unit. A modulation symbol transmitted through the ACK/NACK unit is determined according to bits b(0) and b(1).

For example, when a receiver successfully receives and decodes two data units (i.e., in case of ACK, ACK of [Table 4] above), the receiver transmits two bits (1, 1) using a ACK/NACK unit $n_{PUCCH,1}^{(1)}$. When the receiver receives two data units, if the receiver fails in decoding (or detecting) a first data unit (that is, the data unit 0 corresponding to HARQ-ACK(0)) and succeeds in decoding a second data unit (that is, the data unit 1 corresponding to HARQ-ACK (1)) (i.e., in case of NACK/DTX, ACK of [Table 4] above), the receiver transmits two bits (0,0) using an ACK/NACK unit $n_{PUCCH,1}^{(1)}$.

Likewise, by linking or mapping a combination of actual bit contents of the selected and transmitted ACK/NACK unit (that is, a combination of selection of one of $n_{PUCCH,0}^{(1)}$ and $n_{PUCCH,1}^{(1)}$ and b(0) and b(1) with contents of actual ACK/NACK, ACK/NACK information to a plurality of data units may be transmitted using one ACK/NACK unit. By extending the principle of the aforementioned ACK/NACK multiplexing, ACK/NACK multiplexing for two or more data units can be easily implemented.

In the ACK/NACK multiplexing scheme, basically, when at least ACK is present for all data units, NACK and DTX cannot be distinguished (that is, as indicated by NACK/DTX in [Table 4] above, NACK and DTX may be coupled). This is because not all ACK/NACK states (that is, ACK/NACK hypotheses) that may be generated in order to separately indicate NACK and DTX cannot be reflected by a combination the ACK/NACK units and the QPSK-modulated symbols. When ACK is not present for all data units (that is, when only NACK or DTX is present for all data units), one distinguishable NACK case indicating that only one of HARQ-ACK(i) is a distinguishable NACK (that is, NACK distinguishable from DTX) may be defined. In this case, an ACK/NACK unit corresponding to a data unit corresponding to one distinguishable NACK may be reserved to transmit a plurality of ACK/NACK signals.

Semi-Persistent Scheduling (SPS)

According to DL/UL SPS, first, UE is allocated subframes in which SPS transmission/reception (TX/RX) is performed (at a subframe period and offset) via signaling during radio resource control (RRC) signaling. In reality, SPS activation and release are performed through a PDCCH. That is, although the UE is allocated SPS via RRC signaling, the UE does not perform SPS TX/RX directly. Instead, when the UE receives a PDCCH (i.e., a PDCCH in which SPS C-RNTI is detected) indicating activation (or reactivation), the UE performs an SPS operation accordingly. That is, when the UE receives the SPS activation PDCCH, the UE may be allocated frequency resources according to RB allocation determined in the PDCCH and may begin TX/RX at the subframe period and offset allocated via the RRC signaling using a modulation and coding rate based on MCS information. When the UE receives a PDCCH indicating SPS release, the UE stops TX/RX. When the UE receives a PDCCH signaling activation (or reactivation), the UE may restart TX/RX at the subframe period and offset allocated via the RRC signaling according to the RB allocation determined in the PDCCH, MCS, and so on.

As a PDCCH format defined in current 3GPP LTE, various formats such as DCI format 0 for UL and DCI formats 1, 1A, 1B, 1C, ID, 2, 2A, 3, 3A, etc. for DL are defined. In addition, according to the use of the formats, a combination obtained by selecting control information such as information regarding hopping flag, RB allocation, a modulation coding scheme (MCS), a redundancy version (RV), a new data indicator (NDI), transmit power control (TPC), a cyclic shift demodulation reference signal (DMRS), a UL index, channel quality information (CQI) request, a DL assignment index, an HARQ process number, a transmitted precoding matrix indicator (TPMI), precoding matrix indicator (PMI) confirmation, and so on may be transmitted.

In more detail, it may be validated that a PDCCH is used for SPS activation/release when CRC of DCI transmitted through the PDCCH is masked by SPS C-RNTI and NDI=1 is set. In this case, in case of SPS activation, a combination of bit fields is set to 0 and is used as virtual CRC, as shown in [Table 5] below.

TABLE 5

|  | DCI format 0 | DCI format 1/1A | DCI format 2/2A/2B |
|---|---|---|---|
| TPC command for scheduled PUSCH | set to '00' | N/A | N/A |
| Cyclic shift DMRS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Virtual CRC provides additional error detection capability by checking whether a corresponding bit field value is a given value when errors that cannot be checked via CRC occur. When errors occur in DCI allocated to another UE, if a specific UE does not detect the corresponding errors and misunderstands the errors as SPS activation of the specific UE, the UE continuously uses corresponding resources, and thus, one time error causes contiguous problems. Thus, due to the use of the virtual CRC, SPS is prevented from being wrongly detected.

In case of SPS release, a bit field value is set and is used as virtual CRS, as shown in [Table 6] below.

TABLE 6

|  | DCI format 0 | DCI format 1A |
|---|---|---|
| TPC command for scheduled PUSCH | set to '00' | N/A |
| Cyclic shift DMRS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

Figure 9:
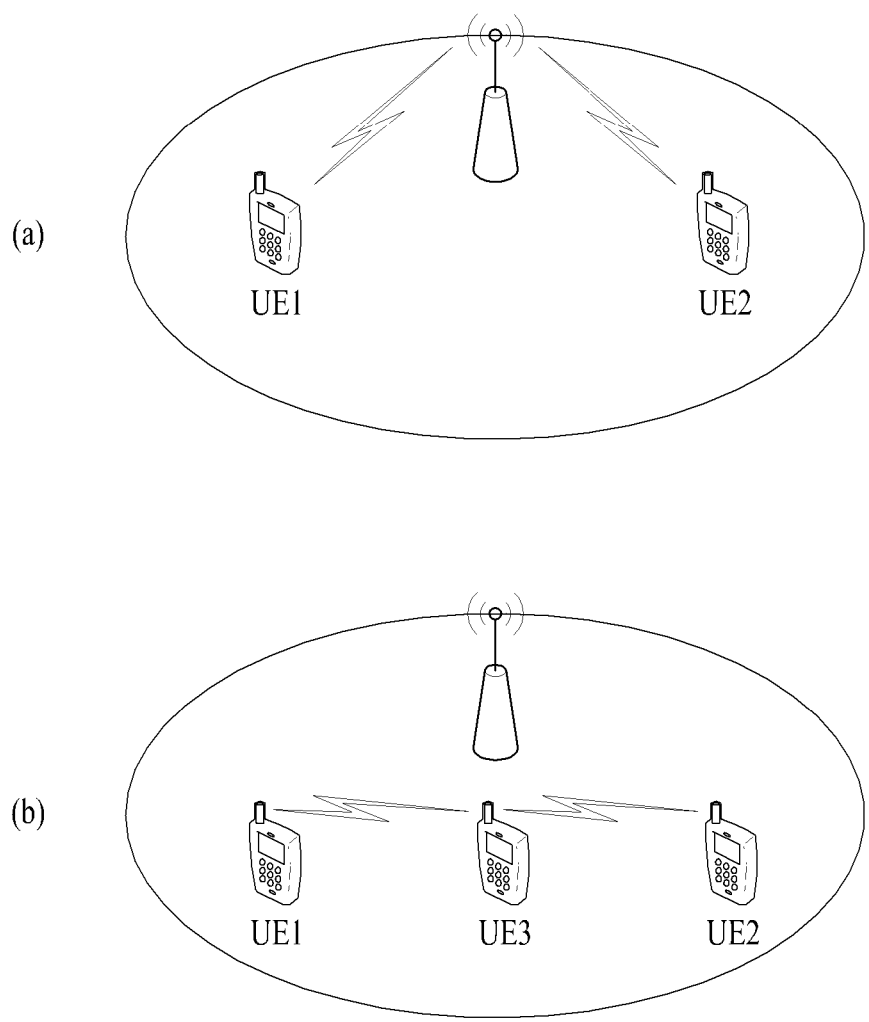
FIG. 9 is a diagram for explanation of a device-to-device (D2D) communication environment to which the present invention is applicable.

Hereinafter, a device-to-device (D2D) communication method via transmission of control information by a coordination station will be described based on the above description of LTE/LTE-A. The coordination station may correspond to a BS or a network as illustrated in FIG. 9(a) or correspond to a UE3 as illustrated in FIG. 9(b). A D2D UE may receive information required for data transmission and reception from the coordination station.

Figure 10:
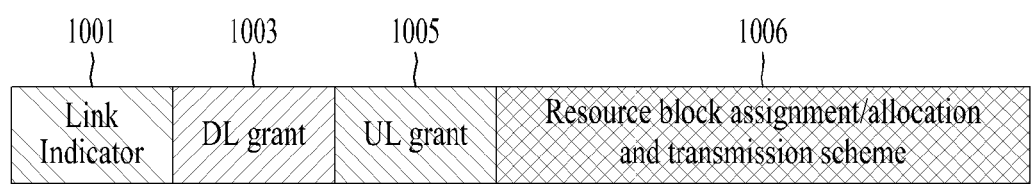
FIG. 10 illustrates an example of a DCI format that can be transmitted by a coordination station for D2D communication according to an embodiment of the present invention.

FIG. 10 illustrates an example of a DCI format that can be transmitted by a coordination station for D2D communication between a first UE and a second UE. As illustrated in FIG. 10, the DCI format for D2D communication may include fields of a link indicator 1001, DL allocation information 1003, UL grant information 1005, and allocation related information 1006 required for data transmission and reception using DL allocation information and/or UL grant information.

The link indicator field indicates link directions of a source station and a destination station. A first UE UE1 as the source station may request the coordination station for D2D communication with a second UE UE2 as the destination station and the second UE UE2 may transmit a response thereto to configure D2D link. In this case, a link direction toward the destination station from the source station may be configured as '0' and a link direction toward the source station from the destination station may be configured as '1'.

The DL allocation information may indicate a resource region for reception of data, and the UL grant information may indicate a resource region for transmission of data. Each allocation information may indicate a resource allocated as the same resource allocation type as a legacy LTE/LTE-A system.

The allocation related information 1006 field may include information required to receive data by the destination station of D2D communication, for example, 'HARQ process number', 'TPC command for PUCCH', 'downlink assignment index', 'carrier indicator' etc. and information required to transmit data to the destination station by the source station, for example, 'cyclic shift for DM RS and OCC index', 'TPC command for scheduled PUSCH', 'CSI request', 'SRS request', 'downlink assignment index', 'carrier indicator', etc. In addition, although not illustrated, a DCI format for D2D communication may include a transmission scheme, for example, modulation and coding scheme and redundancy version, a new data indicator, etc.

An operation of a UE that receives the aforementioned DCI format for D2D communication will now be described with reference to FIG. 11. In an example of FIG. 11, it is assumed that the first UE UE1 as a source station requests a coordination station for D2D communication with the second UE UE2 as a destination station, and the second UE UE2 transmits a response thereto to configure D2D link such that link directions indicated by the link indicator are determined.

Referring to FIG. 11(a), the coordination station transmits the aforementioned DCI format for D2D communication. The first UE that receives the DCI format checks a link indicator. Since the link indicator is '0', the first UE recognizes that data can be transmitted to the second UE that can perform D2D communication with the first UE and receives UL grant information. In addition, the first UE may also receive information such as transmission power information, etc. required to transmit data. Then the first UE may transmit data to the second UE UE2 using resources indicated by UL grant information received in a predetermined subframe.

As described later, a DCI format transmitted from the coordination station may be received by the second UE as well as the first UE of FIG. 11(a). In this case, the second UE checks a link indicator to recognize that the second UE needs to receive data from the first UE. The second UE receives DL allocation information associated with data reception from the first UE in the DCI format for D2D communication. In addition, the second UE may further receive information such as 'HARQ process number' required to receive data from the first UE in the DCI format for D2D communication.

Referring to FIG. 11(b), the first UE that receives the DCI format transmitted from the coordination station checks a link indicator configured as '1' to recognize that the first UE needs to receive data transmitted from the second UE, and receives DL allocation information. Since the link indicator is configured as '1', the second UE may receive UL grant information and transmit data to the first UE.

In short, the source station (or the destination station) may recognize whether it needs to transmit or receive data or whether it needs to receive UL grant information or DL allocation information in the DCI format for D2D communication through the link indicator.

As described above, the DCI format for D2D communication, transmitted by the coordination station, may be for both the source station and the destination station. In this case, both the source station and the destination station needs to receive the DCI format for D2D communication. To this end, the DCI format for D2D communication may be scrambled with link identifiers of the source station and the destination station or a parameter shared by both the stations. For example, when the link identifiers of the source station and the destination station are configured as 15, the source station and the destination station may perform blind decoding on a search space configured as a link identifier 15.

Alternatively, the DCI format for D2D communication may be scrambled with a radio network temporary identifier (RNTI) of the source station (or the destination station) or a UE-specific parameter. In this case, each UE that performs D2D communication needs to perform blind decoding using an RNTI of the destination station (or the source station) or a UE-specific parameter as well as to search for information transmitted to the UE using a C-RNTI of the UE from a search space for the DCI format for D2D communication.

Unlike in the above description, the coordination station may separately transmit information for the source station and the destination station. For example, the coordination station may separately transmit a DCI format of a PDCCH to the source station and the destination station. In this case, information transmitted for the source station and the destination station from the coordination station may be scrambled with an RNTI of each station or another UE-specific parameter.

Hereinafter, a subframe in which the source station/destination station, which receive resource allocation information for transmission of UL/DL transmission from the coordination station, transmit/receive data therebetween according to the corresponding resource allocation information via one of the aforementioned methods will be described.

Figure 12:
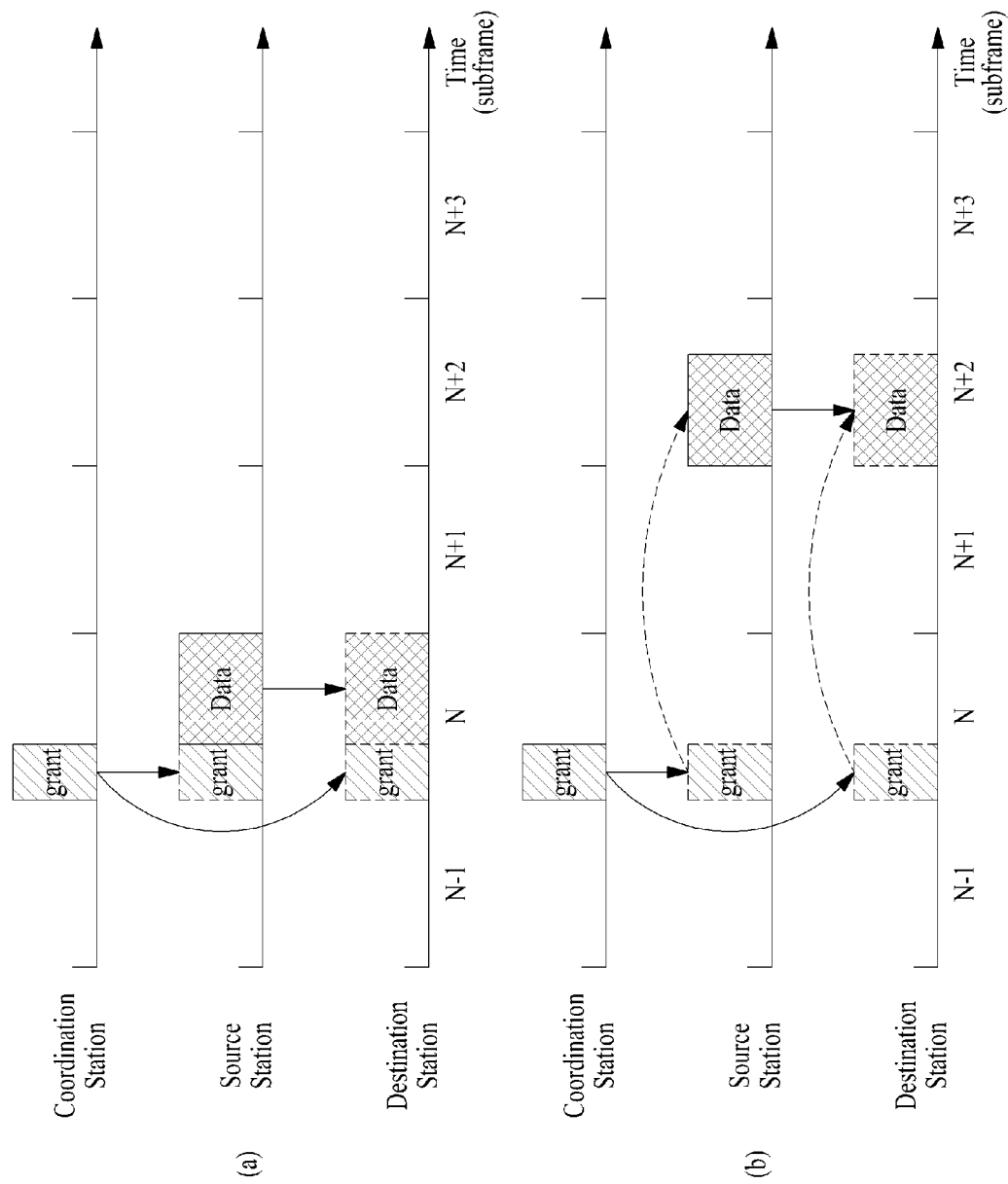
FIGS. 12 and 13 are diagrams for explanation of data transmission/reception timing according to an embodiment of the present invention.

FIG. 12 illustrates the case in which the source station/destination station, which receive UL grant/DL allocation information transmitted from the coordination station, transmit/receive at the same timing.

Referring to FIG. 12(a), the source station receives a DCI format for D2D communication, received from the coordination station in a subframe N, to check a link indicator and receives UL grant information. The source station transmits data to the destination station using resource indicated by UL grant information in the subframe N in which the DCI format for D2D communication is received from the coordination station.

The destination station also receives the DCI format for D2D communication from the coordination station in the subframe N and receives DL grant information through a link indicator. In addition, the destination station may receive data transmitted from the source station in a resource indicated by DL grant information in the subframe N.

That is, in FIG. 12(a), the source station/destination station transmit/receive data in a subframe in which the DCI format for D2D communication, transmitted from the destination station, is received.

Like in FIG. 12(a), FIG. 12(b) illustrates the case in which a subframe in which data is transmitted/received is a subframe after a predetermined period of time (after 2 subframes in FIG. 12(b)) from a subframe in which the DCI format for D2D communication is received when the source station and the destination station transmit/receive data according to UL grant/DL allocation information transmitted from the coordination in the same subframe.

In short, UEs that receive information from the coordination station in a random $N^{th}$ subframe may transmit and receive data in a $(N+k)^{th}$ subframe. In this case, k may be an integer equal to or more than 0 and a cell specific or UE specific value. k may be statically used or dynamically determined via RRC or MAC signaling. In addition, k may be changed according to an index of a subframe in which information is transmitted from the coordination station.

Figure 13:
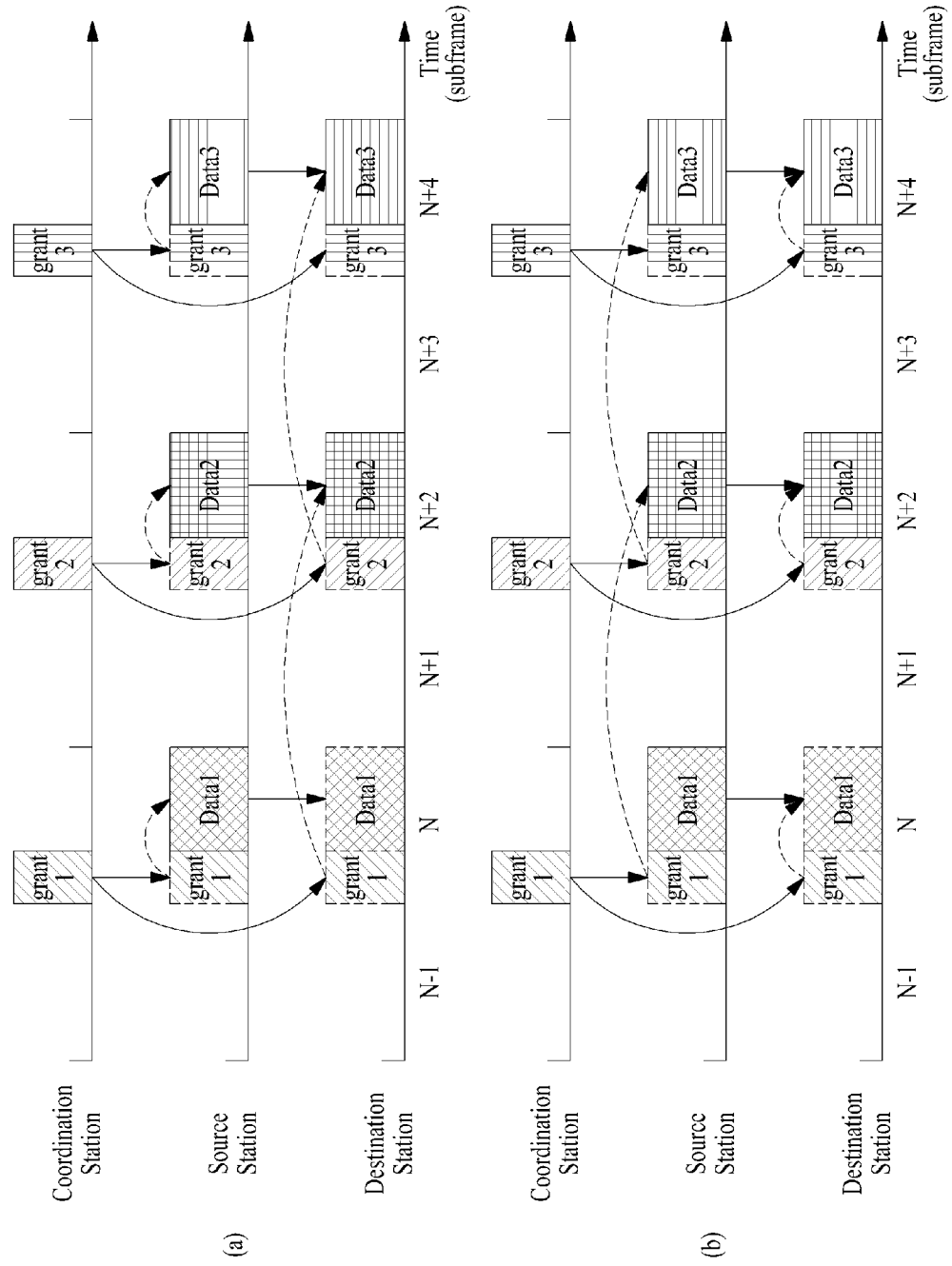

Unlike in FIG. 12, FIG. 13 illustrates the case in which a subframe for actual transmission using corresponding allocation information is changed according to whether resource allocation information acquired by a UE is UL grant or DL allocation.

In detail, referring to FIG. 13(a), the source station and the destination station receive the DCI format for D2D communication in a subframe N. (According to a link indicator) the source station receives UL grant information and the destination station receives DL allocation information. Here, actual transmission via resource indicated by UL grant information may be performed in the subframe N in which the DCI format for D2D communication is received and actual transmission via resource indicated by DL allocation information may be performed in a subframe (N+2) in which the DCI format for D2D communication is received. In this case, in order to receive data transmitted from the source station, the DL allocation owned by the destination station may be included in the DCI format for D2D communication, received by the destination station prior to two subframes.

FIG. 13(b) illustrates the case in which data indicated by UL grant information is transmitted in a subframe after 2 subframes from a subframe in which the DCI format for D2D communication and data indicated by DL allocation information is received in a subframe in which a subframe for transmitting the DCI format for D2D communication is received.

In short, the source station among UEs that receive information from the coordination station in a random $N^{th}$ subframe may transmit data in an $(N+k)^{th}$ subframe and the destination station may receive data in an $(N+q)^{th}$ subframe. In this case, k and q may be an integer equal to or greater than 0 and may be statically used or dynamically determined via RRC or MAC signaling. In addition, k and q may depend on an index of a subframe in which information is transmitted from the coordination station. In other words, k and q may depend on a subframe index.

Figure 14:
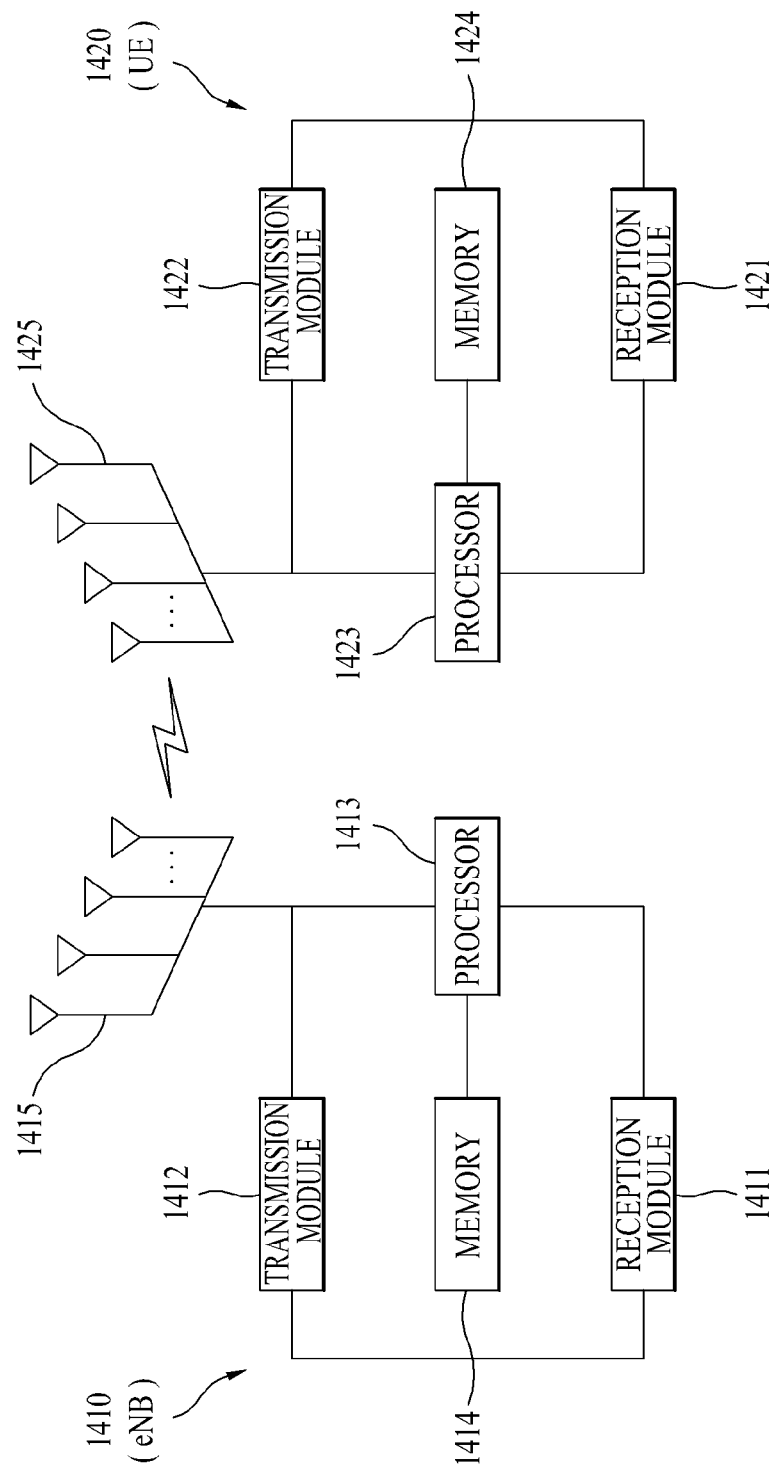
FIG. 14 is a diagram illustrating structures of an eNB and a UE according to the present invention.

FIG. 14 is a diagram illustrating structures of an eNB 1410 and a UE 1420 according to the present invention.

Referring to FIG. 14, the eNB 1410 according to the present invention may include a reception module 1411, a transmission module 1412, a processor 1413, a memory 1414, and a plurality of antennas 1415. The antennas 1415 refer to an eNB apparatus that support MIMO transmission and reception. The reception module 1411 may receive various signals, data, and information in uplink from the UE 1420. The transmission module 1412 may transmit various signals, data, and information in downlink to the UE 1420. The processor 1413 may control an overall operation of the eNB 1410.

The processor 1413 of the eNB 1410 according to an embodiment of the present invention may process the aforementioned various embodiments.

In addition, the processor 1413 of the eNB 1410 may perform a function of processing calculation of information received by the eNB 1410, information to be externally transmitted, etc. The memory 1414 may store calculation-processed information, etc. for a predetermined period of time and may be replaced with a component such as a buffer (not shown).

Referring to FIG. 14, the UE 1420 according to the present invention may include a reception module 1421, a transmission module 1422, a processor 1423, a memory 1419, and a plurality of antennas 1425. The antennas 1425 refer to a UE that supports MIMO transmission and reception. The reception module 1421 may receive various signals, data, and information in downlink from the eNB 1410. The transmission module 1422 may transmit various signals, data, and information in uplink from the eNB 1410. The processor 1423 may control an overall operation of the UE 1420.

The processor 1423 of the UE 1420 according to an embodiment of the invention may process the aforementioned various embodiments.

In addition, the processor 1423 of the UE 1420 may perform a function of processing calculation of information received by the UE 1420, information to be externally transmitted, etc. The memory 1419 may store calculation-processed information, etc. for a predetermined period of time and may be replaced with a component such as a buffer (not shown).

The detailed structures of an eNB and a UE may be configured to independently apply the aforementioned embodiments of the present invention or simultaneously apply two or more embodiments of the present invention, and a repeated description may be omitted for convenience of description.

The above description of eNB 1410 described with reference to FIG. 14 can be applied to an apparatus as a downlink transmitting subject or an uplink receiving subject in the same way, and the above description of the UE 1420 can be applied to a relay apparatus as a downlink receiving subject or an uplink transmitting subject.

The embodiments of the present invention may be achieved by various means, for example, hardware, firmware, software, or a combination thereof.

In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Although the present invention has been described in terms of the case in which the present invention is applied to a $3^{rd}$ generation partnership project (3GPP) long term evolution (LTE) system, the present invention can be used in various mobile communication systems in the same or equivalent principle.

The invention claimed is:

1. A method for receiving control information for device-to-device (D2D) communication with a second user equipment (UE) by a first UE in a wireless communication system, the method comprising:
performing blind decoding on a search space corresponding to a link identifier configured for the first UE;
receiving, in the search space, downlink control information (DCI) comprising a link indicator indicating a link direction for the D2D communication between the first UE and the second UE, downlink allocation information, and uplink grant information;
determining the link direction based on whether the first UE is a source station or a destination station and a value of the link indicator; and
selectively acquiring any one of the downlink allocation information and the uplink grant information according to the determined link direction,
wherein DCI for the first UE is identical to DCI for the second UE and the DCI for the first UE and the second UE are transmitted at the same time from a coordination station, and the downlink allocation information indicates a resource region in which data is received from the second UE, and the uplink grant information indicates a resource region for transmitting data to the second UE, and
wherein the link identifier configured for the first UE is identical to a link identifier configured for the second UE.

2. The method according to claim 1, wherein the DCI is scrambled with a parameter shared by the first UE and the second UE.

3. The method according to claim 2, wherein the parameter is a link identifier of the first UE and the second UE.

4. The method according to claim 1, wherein the DCI is scrambled with a UE-specific parameter.

5. The method according to claim 1, wherein:
when the first UE acquires the uplink grant information, data is transmitted via the resource indicated by the uplink grant information to the second UE in a kth subframe from a subframe in which the DCI is received by the first UE and the second UE, according to the uplink grant information; and
when the first UE acquires the downlink grant information, data is received via the resource indicated by the downlink grant information from the second UE in a qth subframe from a subframe in which the DCI is received by the first UE and the second UE, according to the downlink grant information.

6. The method according to claim 1, wherein k and q depend on an index of a subframe in which the DCI is received.

7. A first user equipment (UE) apparatus for performing device-to-device (D2D) communication with a second UE in a wireless communication system, the UE apparatus comprising:
a reception module; and
a processor, connected with the reception module, that:
performs blind decoding on a search space corresponding to a link identifier configured for the first UE,
controls the reception module to receive, in the search space, a downlink control information (DCI) comprising a link indicator indicating a link direction for the D2D communication between the first UE and the second UE, downlink allocation information, and uplink grant information,
determines the link direction based on whether the first UE is a source station or a destination station and a value of the link indicator, and
selectively acquires any one of the downlink allocation information and the uplink grant information according to the determined link direction,
wherein DCI for the first UE is identical to DCI for the second UE and the DCI for the first UE and the second UE are transmitted at the same time from a coordination station, and the downlink allocation information indicates a resource region in which data is received from the second UE, and the uplink grant information indicates a resource region for transmitting data to the second UE, and
wherein the link identifier configured for the first UE is identical to a link identifier configured for the second UE.

8. The UE apparatus according to claim 7, wherein the DCI is scrambled with a parameter shared by the first UE and the second UE.

9. The UE apparatus according to claim 8, wherein the parameter is a link identifier of the first UE and the second UE.

10. The UE apparatus according to claim 7, wherein the DCI is scrambled with a UE-specific parameter.

11. The UE apparatus according to claim 7, wherein:
when the first UE acquires the uplink grant information, data is transmitted via the resource indicated by the uplink grant information to the second UE in a kth subframe from a subframe in which the DCI is received by the first UE and the second UE, according to the uplink grant information; and
when the first UE acquires the downlink grant information, data is received via the resource indicated by the downlink grant information from the second UE in a qth subframe from a subframe in which the DCI is received by the first UE and the second UE, according to the downlink grant information.

12. The UE apparatus according to claim 7, wherein k and q depend on an index of a subframe in which the DCI is received.

* * * * *